United States Patent
Bora et al.

(10) Patent No.: US 12,194,980 B1
(45) Date of Patent: Jan. 14, 2025

(54) METHOD AND COMPUTER SYSTEM FOR ENGINE SPEED CONTROL

(71) Applicant: Volvo Truck Corporation, Gothenburg (SE)

(72) Inventors: Teodoro Bora, Gothenburg (SE); Therese Mäsak, Henån (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/742,153

(22) Filed: Jun. 13, 2024

(30) Foreign Application Priority Data

Jun. 21, 2023 (EP) .................................. 23180785

(51) Int. Cl.
*B60W 10/10* (2012.01)
*B60W 10/18* (2012.01)

(52) U.S. Cl.
CPC ............ *B60W 10/10* (2013.01); *B60W 10/18* (2013.01); *B60W 2510/18* (2013.01); *B60W 2710/18* (2013.01)

(58) Field of Classification Search
CPC .... B60W 10/10; B60W 10/18; B60W 10/196; B60W 10/184; B60W 2510/18; B60W 2710/18
See application file for complete search history.

(56) References Cited

U.S. PATENT DOCUMENTS

| | | | |
|---|---|---|---|
| 8,589,045 B2 | 11/2013 | Seymour et al. | |
| 10,065,641 B2 | 9/2018 | Fraser et al. | |
| 10,829,098 B2 | 11/2020 | Perlick et al. | |
| 2011/0106388 A1 | 5/2011 | Boeckenhoff et al. | |
| 2012/0215412 A1 | 8/2012 | Seymour et al. | |
| 2017/0297573 A1 | 10/2017 | Fraser et al. | |
| 2018/0244269 A1* | 8/2018 | Carlsson | B60W 30/1884 |
| 2019/0025857 A1* | 1/2019 | Luckevich | G05D 1/695 |
| 2020/0017078 A1 | 1/2020 | Perlick et al. | |
| 2021/0237728 A1 | 8/2021 | Wessel et al. | |
| 2022/0176962 A1* | 6/2022 | Smith | B60W 50/0097 |

FOREIGN PATENT DOCUMENTS

| | | |
|---|---|---|
| CN | 107826124 A | 3/2018 |
| CN | 115675461 A | 2/2023 |
| DE | 10357444 A1 | 6/2004 |

(Continued)

OTHER PUBLICATIONS

Extended European Search Report for European Patent Application No. 23180785.0, mailed Jan. 2, 2024, 10 pages.

*Primary Examiner* — Edwin A Young (74) *Attorney, Agent, or Firm* — Withrow & Terranova, PLLC (57) ABSTRACT

A computer system, comprising processing circuitry configured to: determine that an auxiliary brake power is insufficient to prevent a vehicle running along a downhill road segment from exceeding a maximum engine speed, determine a utilization rate of one or more service brakes of the vehicle to prevent the vehicle from exceeding the maximum engine speed along the downhill road segment, determine that the utilization rate exceeds a predetermined threshold, and based on the utilization rate exceeding the predetermined threshold, control a downshift of the vehicle to increase the auxiliary brake power.

20 Claims, 8 Drawing Sheets

(56) References Cited

FOREIGN PATENT DOCUMENTS

| | | | |
|---|---|---|---|
| JP | 2017043238 | A | 3/2017 |
| SE | 544696 | C2 | 10/2022 |
| WO | 2011075068 | A1 | 6/2011 |
| WO | 2015197092 | A1 | 12/2015 |
| WO | 19151918 | A1 | 8/2019 |

* cited by examiner

METHOD AND COMPUTER SYSTEM FOR ENGINE SPEED CONTROL

PRIORITY APPLICATIONS

The present application claims priority to European Patent Application No. 23180785.0, filed on Jun. 21, 2023, and entitled "METHOD AND COMPUTER SYSTEM FOR ENGINE SPEED CONTROL," which is incorporated herein by reference in its entirety.

TECHNICAL FIELD

The disclosure relates generally to a method and computer system for controlling engine speed. In particular aspects, the disclosure relates to controlling engine speed of vehicles. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Vehicles may benefit from automatic engine speed control, especially when the vehicle is running downhill. The vehicle speed should preferably be kept within a speed range, which when driving downhill requires increased use of vehicle brakes to prevent the vehicle from gaining too much speed. To brake, the vehicle may use auxiliary brakes and/or service brakes. Auxiliary brakes are preferred to prevent wear and increase longevity of the services brakes, but braking power of auxiliary brakes is lower at higher gears.

There is a need for automatically controlling high vehicle speeds while reducing reliance on the service brakes.

SUMMARY

According to a first aspect of the disclosure, a computer system is provided. The computer system comprises processing circuitry configured to determine that an auxiliary brake power is insufficient to prevent a vehicle running along a downhill road segment from exceeding a maximum engine speed, determine a utilization rate of one or more service brakes of the vehicle to prevent the vehicle from exceeding the maximum engine speed along the downhill road segment, determine that the utilization rate exceeds a predetermined threshold, and based on the utilization rate exceeding the predetermined threshold, control a downshift of the vehicle to increase the auxiliary brake power. The first aspect of the disclosure may seek to improve adaptive speed control in downhill. A technical benefit may include reducing the use of service brakes of the vehicle automatically.

Optionally in some examples, including in at least one preferred example, the processing circuitry is further configured to activate said one or more service brakes prior to control the downshift from a higher gear of a gearbox of the vehicle to a lower gear of the gearbox of the vehicle. A technical benefit may include allowing a limited use of the service brakes to prevent unnecessary downshifting.

Optionally in some examples, including in at least one preferred example, the processing circuitry is further configured to determine that the utilization rate does not exceed the predetermined threshold, and to maintain a current gear of a gearbox of the vehicle based on the utilization rate not exceeding the predetermined threshold. A technical benefit may include allowing the vehicle to run at a high speed and allow a limited use of the service brakes before downshifting to increase the braking power of the auxiliary brakes.

Optionally in some examples, including in at least one preferred example, the processing circuitry is further configured to determine a utilization scheme for said one or more service brakes to prevent the maximum engine speed to be exceeded along the downhill road segment, and to activate said one or more service brakes according to the utilization scheme. A technical benefit may include an improved use of the service brakes to optimize the useful life of the service brakes and prevent wear, but also to allow the vehicle to run at a higher speed.

Optionally in some examples, including in at least one preferred example, the utilization rate is determined based on an idle time period until a required activation of the one or more service brakes, and wherein the predetermined threshold is a time value. A technical benefit may include using time as a parameter for utilization rate, thereby allowing for a limited use of the service brake before downshifting.

Optionally in some examples, including in at least one preferred example, the utilization rate is determined based on a total activation time of the one or more service brakes, and wherein the predetermined threshold is a time value. A technical benefit may include a more complete parameter for the utilization rate, thereby allowing for a limited use of the service brake before downshifting.

Optionally in some examples, including in at least one preferred example, the total activation time is a continuous activation time or a non-continuous activation time over a time period. A technical benefit may include determining the use time, e.g., the utilization rate, as one continuous activation of the one or more service brakes or as the sum of a plurality of activations of the one or more service brakes. Hence, a more versatile configuration is provided.

Optionally in some examples, including in at least one preferred example, the utilization rate is determined based on activation duration and/or activation intensity of the one or more service brakes of the vehicle. A technical benefit may include a more accurate estimation of the utilization rate, and thereby the potential wear to the service brake, as both activation time and intensity may be considered.

Optionally in some examples, including in at least one preferred example, the utilization rate is determined based on an estimated inclination of the downhill road segment. A technical benefit may include a more accurate estimation of the utilization rate, as acceleration due to the downhill road segment may be included.

Optionally in some examples, including in at least one preferred example, the utilization rate is determined based on a measured or estimated rolling resistance and/or air drag of the associated vehicle, and/or based on an estimated mass of the associated vehicle. A technical benefit may include a more accurate estimation of the utilization rate, as deceleration due to the rolling resistance and/or air drag may be included.

Optionally in some examples, including in at least one preferred example, the utilization rate is determined based on the available amount of auxiliary brake power. A technical benefit may include a more accurate estimation of the utilization rate, as deceleration due to maximum applied auxiliary brake power may be included.

Optionally in some examples, including in at least one preferred example, the processing circuitry is further configured to activate said one or more service brakes prior to control the downshift from a current higher gear of a gearbox of the vehicle to a lower gear of the gearbox of the vehicle, maintain a current gear of the gearbox of the vehicle based on the utilization rate not exceeding the predetermined threshold, determine a utilization scheme for said one or more service brakes to prevent the maximum engine speed to be exceeded along the downhill road segment, and activate said one or more service brakes according to the utilization scheme, wherein the utilization rate is determined based on an idle time period until a required activation of the one or more service brakes, and/or based on a total activation time of the one or more service brakes, wherein the predetermined threshold is a time value and wherein the total activation time is a continuous activation time or a non-continuous activation time over a time period, and/or based on activation duration and/or activation intensity of the one or more service brakes of the vehicle, wherein the utilization rate is determined based on an estimated inclination of the downhill road segment, and/or based on a measured or estimated rolling resistance and/or air drag of the associated vehicle, and/or based on an estimated mass of the associated vehicle, and/or based on the available amount of auxiliary brake power.

According to a second aspect of the disclosure, a vehicle is provided. The vehicle comprises a computer system of the first aspect.

Optionally in some examples, including in at least one preferred example, the vehicle further comprises at least one gearbox, at least one service brake, and at least one auxiliary brake device, wherein the at least one auxiliary brake device comprises a retarder. A technical benefit may include using braking force from the retarder to adaptively control the speed. As defined herein, a retarder broadly covers any device replacing the functions of primary brakes (e.g., service brakes). Examples of retarders include, but are not limited to, engine brakes, exhaust brakes, hydraulic retarders, and electric retarders.

According to a third aspect of the disclosure, a computer-implemented method is provided. The computer-implemented method comprises determining, by processing circuitry of a computer system, that an auxiliary brake power is insufficient to prevent a vehicle running along a downhill road segment from exceeding a maximum engine speed, determining, by the processing circuitry, a utilization rate of one or more service brakes of the vehicle to prevent the vehicle from exceeding the maximum engine speed along the downhill road segment, determining, by the processing circuitry, that the utilization rate exceeds a predetermined threshold, and based on the utilization rate exceeding the predetermined threshold controlling, by the processing circuitry, a downshift of the vehicle to increase the auxiliary brake power. The third aspect of the disclosure may seek to improve adaptive speed control in downhill. A technical benefit may include reducing the use of service brakes of the vehicle automatically.

Optionally in some examples, including in at least one preferred example, the computer-implemented method further comprises activating said one or more service brakes prior to control the downshift from a current higher gear of a gearbox of the vehicle to a lower gear of the gearbox of the vehicle. A technical benefit may include a more smooth downshift of the vehicle.

Optionally in some examples, including in at least one preferred example, the computer-implemented method further comprises determining that the utilization rate does not exceed the predetermined threshold, and maintaining a current gear of a gearbox of the vehicle based on the utilization rate not exceeding the predetermined threshold. A technical benefit may include allowing the vehicle to run at a high speed, and to rely on the use of the available auxiliary brake power.

Optionally in some examples, including in at least one preferred example, the computer-implemented method further comprises determining a utilization scheme for said one or more service brakes to prevent the maximum engine speed to be exceeded along the downhill road segment, and activating said one or more service brakes according to the utilization scheme. A technical benefit may include an improved prediction of the required use of the service brakes, thereby enabling a more intelligent adaptation of the engine speed.

According to a fourth aspect of the disclosure, a computer program product is provided. The computer program product comprises program code for performing, when executed by the processing circuitry, the method of the third aspect.

According to a fifth aspect of the disclosure a non-transitory computer-readable storage medium is provided. The non-transitory computer-readable storage medium comprises instructions, which when executed by the processing circuitry, cause the processing circuitry to perform the method of the third aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

DETAILED DESCRIPTION

The detailed description set forth below provides information and examples of the disclosed technology with sufficient detail to enable those skilled in the art to practice the disclosure.

Figure 1A:
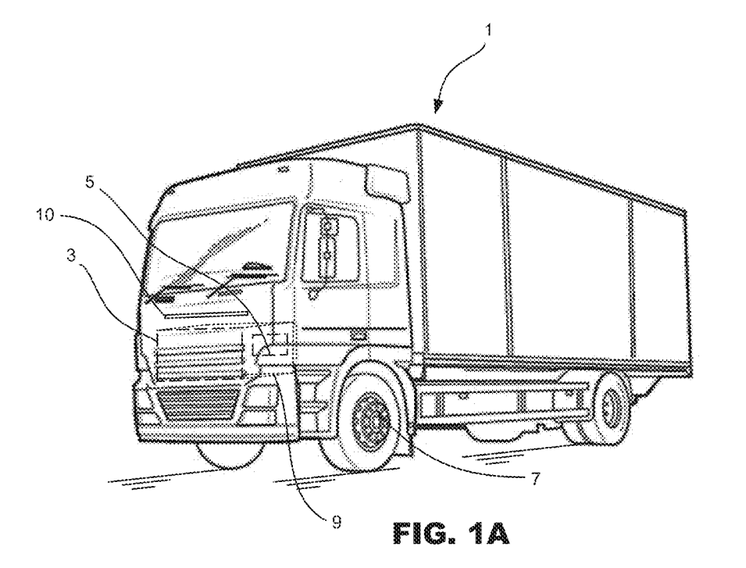
FIG. 1A is an exemplary view of a heavy vehicle, according to an example.

FIG. 1A is an exemplary view of vehicle 1 according to an example. Although illustrated as a truck, the vehicle 1 may be any type of vehicle, such as a heavy duty vehicle or a light duty vehicle. The vehicle 1 comprises various components as is well known in the art, including an engine 3 and a gearbox 5 as well as one or more service brakes 7 and at least one auxiliary brake device 9. The vehicle 1 further comprises a control system 10 configured to provide adaptive engine speed control when the vehicle 1 travels downhill.

Figure 1B:
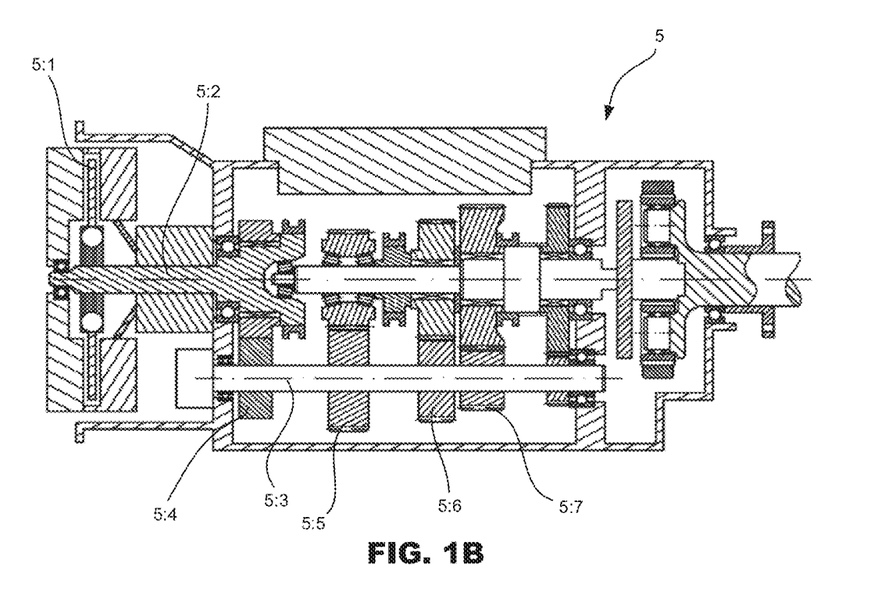
FIG. 1B is an exemplary view of a gearbox for a vehicle, according to an example.

FIG. 1B is an exemplary view of a gearbox 5. The gearbox 5 as shown may be implemented as an automated mechanical transmission for a truck and comprises a clutch 5:1, an input shaft 5:2, a countershaft 5:3, sets of intermeshing gear wheels 5:4, 5:5, 5:6, 5:7 representing different gears ranging from a low gear to a high gear. The clutch 5:1 is adapted to drivingly disengage and engage the input shaft 5:2 with respect to e.g. the engine 3 as shown in FIG. 1A.

Figure 2:
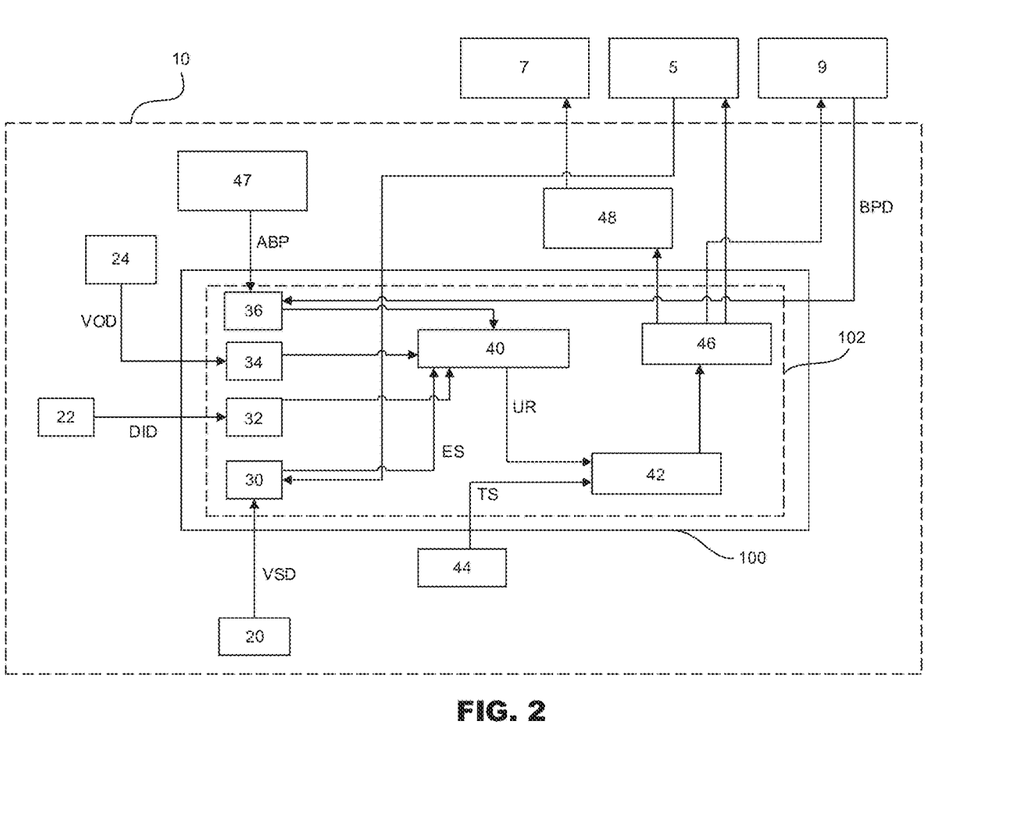
FIG. 2 is a schematic diagram of a control system according to an example.

FIG. 2 is an exemplary schematic diagram of a control system 10 according to an example, implemented to adaptively control of the engine speed. The control system 10 may comprise various hardware and software components to perform the desired functions. The control system 10 comprises a computer system 100, details of which are further illustrated in FIG. 7.

The computer system 100 comprises processing circuitry 102 being configured to receive various input data, and to generate and transmit control data for the desired control of the engine speed.

As is shown in FIG. 2, the control system 10 comprises a plurality of data acquisition devices 20, 22, 24. A first data acquisition device 20 is configured to provide maximum allowed vehicle speed data VSD. The maximum allowed vehicle speed may for example be set by the driver using a cruise control function of the vehicle 1 or by any other suitable means. In another example, the maximum allowed vehicle speed is determined based on other data than driver input, for example using official speed limit data.

The maximum allowed vehicle speed data VSD is received by a speed data circuit 30 configured to determine a maximum allowed engine speed ES based on the maximum allowed vehicle speed data. The speed data circuit 30 may for this purpose also receive additional data, such as data representing the current gear of the vehicle gearbox 5.

A second data acquisition device 22 is configured to provide downhill inclination data DID of the current road segment. The downhill inclination may for example be measured in real time by an accelerometer or other suitable sensor of the second data acquisition device 22 or by any other suitable means. In another example, the downhill inclination is determined based on other data than real time measurements, for example using GPS and/or map data.

The downhill inclination data DID is received by an inclination data circuit 32 configured to act as an interface for further processing of the downhill inclination data.

A third data acquisition device 24 is configured to provide vehicle operation data VOD to the computer system 100. The vehicle operation data VOD may be any data representing speed relevant information for the vehicle 1, both directly and indirectly relevant. For example, the vehicle operation data may represent a current rolling resistance of the vehicle 1, current air drag of the vehicle 1, and/or the mass of the vehicle 1. The vehicle operation data VOD may be real time measured data from sensors and/or estimated data from other type of data providing devices.

The vehicle operation data is received by a vehicle operation data circuit 34 configured to act as an interface for further processing of the vehicle operation data.

An auxiliary brake power data circuit 36 is configured to receive available auxiliary brake power data BPD. The available auxiliary brake power may be determined in different ways. For example, auxiliary brake power ABP of the vehicle 1 may be stored in a memory 37 of the computer system 100. The available auxiliary brake power may be determined based on vehicle operation data (such as current vehicle speed), and/or the engagement level of the auxiliary brake device 9. The available auxiliary brake power may further be estimated and/or calculated.

The control system 10 further comprises a determination circuit 40. The determination circuit 40 is configured to determine an estimated utilization rate UR of the one or more service brakes 7 of the vehicle 1 as the vehicle 1 continues to travel along the downhill road segment. The estimated utilization rate UR may be a common utilization rate for all service brakes 7 of the vehicle 1. According to other examples, the estimated utilization rate UR is a set of individual utilization rates, each utilization rate of the set of individual utilization rates being associated with a specific service brake 7 of the one or more service brakes 7. The determination circuit 40 receives data from the speed data circuit 30, the inclination data circuit 32, the vehicle operation data circuit 34, and from the auxiliary brake power data circuit 36. Based on these data, at least partly, the determination circuit 40 determines the estimated utilization rate UR of the one or more service brakes 7 of the vehicle 1.

The estimated utilization rate UR may be determined in various ways. For example, the estimated utilization rate UR is determined as an estimated idle time period until the one or more service brakes 7 need to be activated to prevent the vehicle 1 from exceeding the maximum allowed vehicle speed. In another example, the estimated utilization rate UR is determined as an estimated total activation time of the one or more service brakes 7 to prevent the vehicle 1 from exceeding the maximum allowed vehicle speed. The total activation time may be a continuous activation time, e.g., the time from activating the one or more service brakes 7 of the vehicle 1 until deactivation the one or more service brakes 7. The total activation time may in other examples by a discontinuous activation time. For example, the total activation time may be determined as the total activation time for the next 60 seconds, including two or more activations or engagements of the one or more service brakes 7 of the vehicle 1. In a further example, the estimated utilization rate UR is determined as the activation intensity of the one or more service brakes 7. The activation intensity may be determined as a continuous activation intensity, a maximum activation intensity, an average activation intensity, a discontinuous activation intensity, etc.

As is evident from above, the estimated utilization rate UR may be determined as any parameter representing an estimation of the required use of the one or more service brakes 7 to prevent the speed from exceeding a maximum allowed speed. Due to the intrinsic relationship between the vehicle speed and the engine speed (preferably taking the current gear into consideration), the maximum allowed speed may be any of the engine speed and the vehicle speed.

The estimated utilization rate UR is received by a comparing circuit 42. The comparing circuit 42 also receives a threshold TS from a threshold data circuit 44. The threshold is preferably predetermined, and represent a maximum allowed utilization rate of the one or more service brakes 7 for the adaptive speed control algorithm. As is evident from the foregoing, the predetermined threshold may be a time period, an intensity level, etc. The output from the comparing circuit 42 is used as input for a controlling circuit 46. Depending on the output, e.g. how the estimated utilization rate UR relates to the predetermined threshold TS, different control of the vehicle 1 is performed.

If the estimated utilization rate UR is below (or equal to) the predetermined threshold TS, it is determined that the one or more service brakes 7 can be used to control the vehicle 1 to not exceed the maximum allowed vehicle speed. The controlling circuit 46 may then transmit data to a utilization scheme circuit 48 which is configured to design an appropriate utilization scheme for the one or more service brakes 7. For example, the utilization scheme circuit 48 may control the one or more service brakes 7 to be activated for a certain time period, at a certain intensity, and/or until the speed has decreased to a certain level. The controlling circuitry 46 may also control the auxiliary brake device 9 to ensure maximum usage of the available auxiliary brake power.

If the estimated utilization rate UR exceeds the predetermined threshold TS, it is determined that the estimated use of the one or more service brakes 7 is too high to motivate its use to control the vehicle 1 to not exceed the maximum allowed vehicle speed. The controlling circuit 46 is therefore configured to reduce the future use of the one or more service brakes 7 by controlling a downshift of the vehicle 1 from a current higher gear of the gearbox 5 to a lower gear of the gearbox 5. A downshift will immediately increase the available auxiliary brake power to decrease use and/or reliance of the one or more service brakes 7. Controlling a downshift may either be made automatically, or by prompting the driver to manually downshift. Controlling such downshifting may be performed in conjunction with additional control of the one or more service brakes 7 and/or the auxiliary brake device 9. For example, the utilization scheme circuit 48 may control the one or more service brakes 7 to be activated for a certain time period, at a certain intensity, and/or until the speed has decreased to a certain level in order to facilitate the downshifting. The controlling circuitry 46 may also control the auxiliary brake device 9 to ensure maximum usage of the available auxiliary brake power before activating the one or more service brakes 7.

According to a further example, the control system 10 may be configured to apply additional control of the vehicle 1 by controlling upshifting of the gearbox 5 from a lower current gear to a higher gear. Such routine may be implemented for example when the estimated utilization rate of the one or more service brakes 7 is very low, such as zero or close to zero. If this is the case an estimated utilization rate UR of the one or more service brakes 7 may be estimated for a higher gear, and subsequently a comparison may be done with a predetermined threshold TS. If the estimated utilization rate UR is below the threshold TS, upshifting will be performed. Alternatively, or in combination, an estimation of the available auxiliary brake power for a higher gear may be made. If the available auxiliary brake power is sufficient to keep the vehicle speed from not exceeding the maximum allowed speed, upshifting may be performed.

Figure 3:
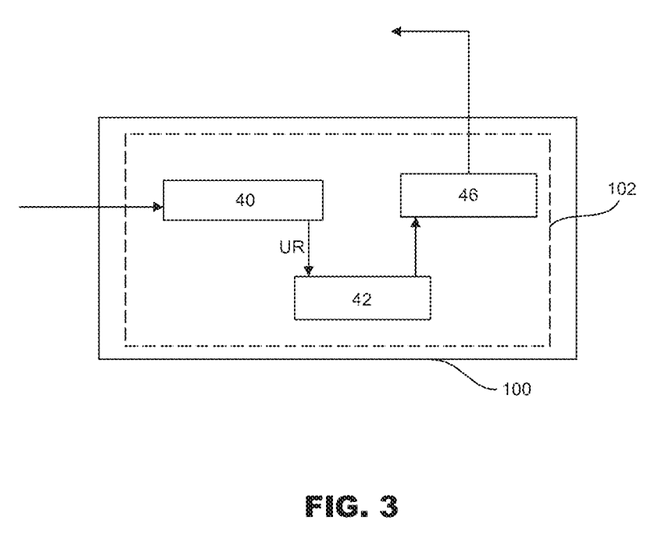
FIG. 3 is a schematic diagram of a computer system according to an example.

In FIG. 3 an example of a computer system 100 is shown. The computer system 100 comprises processing circuitry 102 configured to determine that an auxiliary brake power is insufficient to prevent a vehicle running along a downhill road segment from exceeding a maximum engine speed. The processing circuitry 102 is further configured to determine, for example using a determination unit 40, an estimated utilization rate UR of one or more service brakes of the vehicle to prevent the vehicle from exceeding the maximum engine speed along the downhill road segment. The processing circuitry 40 is further configured to determine, for example using a comparing circuit 42, that the estimated utilization rate UR exceeds a predetermined threshold, and based on the utilization rate exceeding the predetermined threshold, control, for example using a controlling circuit 46, a downshift of the vehicle to increase the auxiliary brake power.

Figure 4:
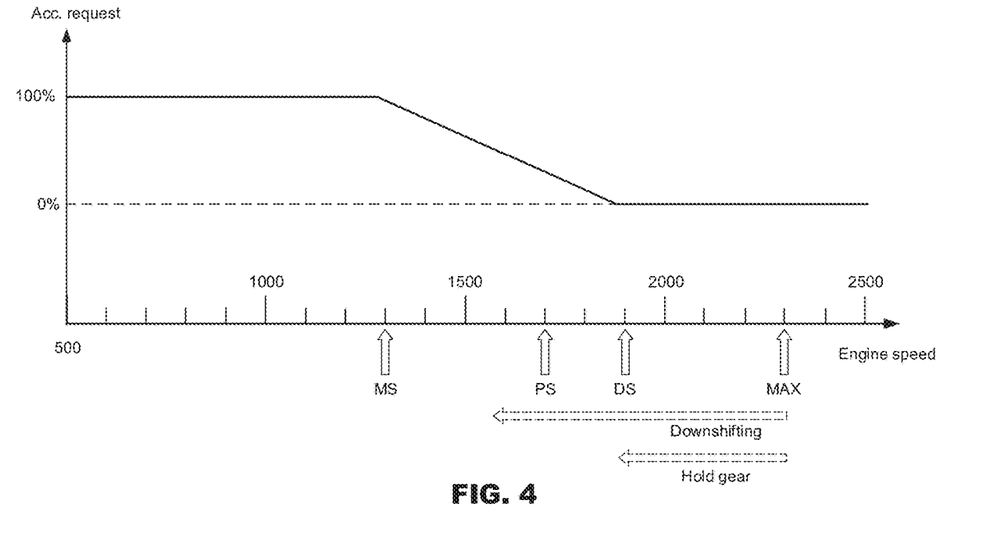
FIG. 4 is an exemplary time sequence of a method to control engine speed according to an example.

An example of a methodology for adaptive speed control is shown in FIG. 4. The diagram displays the engine speed as the x-axis, and some specific engine speed values are indicated by block arrows. It should be noted that the specific engine speed indications are examples only, and the engine speed values could be altered or shifted to fit with specific applications and situations.

A minimum speed MS is pre-set at 1300 rpm. If the actual speed decreases so that the minimum speed is reached, the speed control method will allow the vehicle to accelerate downhill. A so called performance speed PS is pre-set at 1700 rpm. The performance speed PS indicates a target engine speed; when the actual speed is below the performance speed PS, the vehicle will be allowed to accelerate up to the performance speed PS.

A droop speed DS is pre-set at 1900 rpm. The droop speed DS represents the target engine speed when using the one or more service brakes 7 for braking the vehicle 1 without downshifting.

A maximum speed MAX is preset at 2300 rpm. When the actual engine speed reaches the maximum speed MAX, a decision point is reached at which the method decides if downshifting should be performed or not. According to one example, the method may decide that downshifting is not required as an estimated utilization rate of the one or more service brakes 7 does not exceed a pre-determined threshold. The one or more service brakes 7 will then be activated until the droop speed DS is reached whereupon the one or more service brakes 7 is released and the vehicle 1 is allowed to accelerate. This is indicated by the dashed block arrow labelled "hold gear".

The method may, in another situation and/or example, decide that downshifting is in fact required as the estimated utilization rate of the one or more service brakes 7 does exceed the pre-determined threshold. The estimated utilization rate may be the time required for the engine speed to accelerate from the droop speed DS (i.e. when an assumed activation of the one or more service brakes 7 is released) to the maximum speed MAX. In many situations downshifting will cause the engine speed to decrease below the performance speed PS.

The curve in the diagram illustrates the acceleration target of the engine speed. At low engine speed the acceleration target is at 100%, e.g., no braking using the auxiliary brake device 9 is requested. From the minimum speed MS, the acceleration target decreases meaning that the auxiliary brake power is utilized. When the engine speed exceeds the droop speed DS, the acceleration target is 0%, e.g., full braking using the auxiliary brake device 9 is requested.

Figure 5:
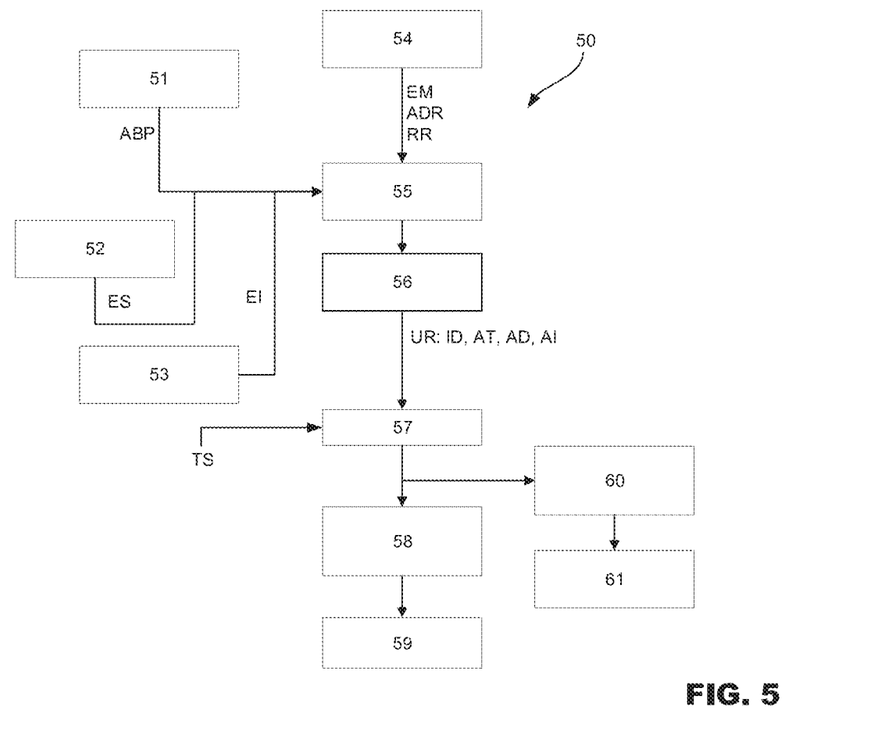
FIG. 5 is a flow chart of an exemplary method to control engine speed according to an example.

FIG. 5 shows an example of a method 50 for engine speed control. The method 50, which is computer-implemented by processing circuitry 102 of a computer system 100, comprises determining 51 the available auxiliary brake power ABP of a vehicle 1. The available auxiliary brake power ABP is for example determined based on a well known maximum auxiliary brake power and a level of auxiliary brake power currently used.

The method further comprises determining 52 the maximum allowed engine speed ES, and determining 53 characteristics of a downhill road segment on which the vehicle 1 is currently running, such as an estimated inclination EI of the downhill road segment. Yet further, the method 50 comprises determining 54 at least one vehicle operation parameter, such as mass EM, air drag ADR, and/or rolling resistance RR.

Based on the determined data, the method 50 comprises determining 55 that the available auxiliary brake power is insufficient to prevent the vehicle 1 running along the downhill road segment from exceeding the maximum allowed engine speed.

When it is determined 55 that the available auxiliary brake power is insufficient, the method 50 comprises estimating 56 a utilization rate UR of one or more service brakes 7 of the vehicle 1 to prevent the vehicle 1 from exceeding the maximum engine speed along the downhill road segment.

The estimated utilization rate UR may be determined based on an idle time period ID until a required activation of the one or more service brakes 5, and/or a total activation time AT of the one or more service brakes 7. The predetermined threshold TS may be a time value. The estimated utilization rate UR may be determined based on activation duration AD and/or activation intensity AI of the one or more service brakes 7.

The method 50 further comprises comparing 57 the estimated utilization rate UR with a predetermined threshold TS. If it is decided that the estimated utilization rate UR exceeds the predetermined threshold TS, indicating that the one or more service brakes 7 needs to be activated at a higher degree than desired, the method 50 comprises controlling 58 the one or more service brakes 7 to cause a temporary speed reduction, and subsequently controlling 59 a downshift of the vehicle 1 to increase the available auxiliary brake power.

On the other hand, if it is decided that the estimated utilization rate UR does not exceed the predetermined threshold TS, indicating that the one or more service brakes 7 needs to be activated at an allowable degree only, the method 50 comprises determining 60 a utilization scheme for the one or more service brakes 7 of the vehicle 1, and controlling 61 the one or more service brakes 7 to cause the desired speed reduction while maintaining the current gear of the vehicle's 1 gearbox.

Figure 6:
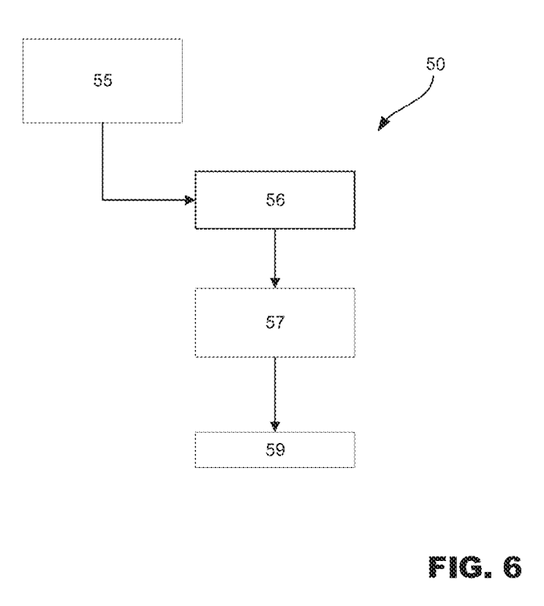
FIG. 6 is a flow chart of an exemplary method to control engine speed according to an example.

A method 50 for engine speed control, according to one example, is shown in FIG. 6. The method 50, which is computer-implemented by processing circuitry 102 of a computer system 100, comprises determining 55 that the available auxiliary brake power of the vehicle 1 is insufficient to prevent the vehicle 1 running along the downhill road segment from exceeding the maximum allowed engine speed.

Based on the non-available auxiliary brake power, the method 50 comprises estimating 56 a utilization rate of the one or more service brakes 7 of the vehicle 1 being required to prevent the vehicle 1 from exceeding the maximum engine speed.

The method 50 further comprises determining 57 that the estimated utilization rate exceeds a predetermined threshold, and based on the estimated utilization rate exceeding the predetermined threshold, the method 50 comprises controlling 59 a downshift of the vehicle to increase the auxiliary brake power.

Figure 7:
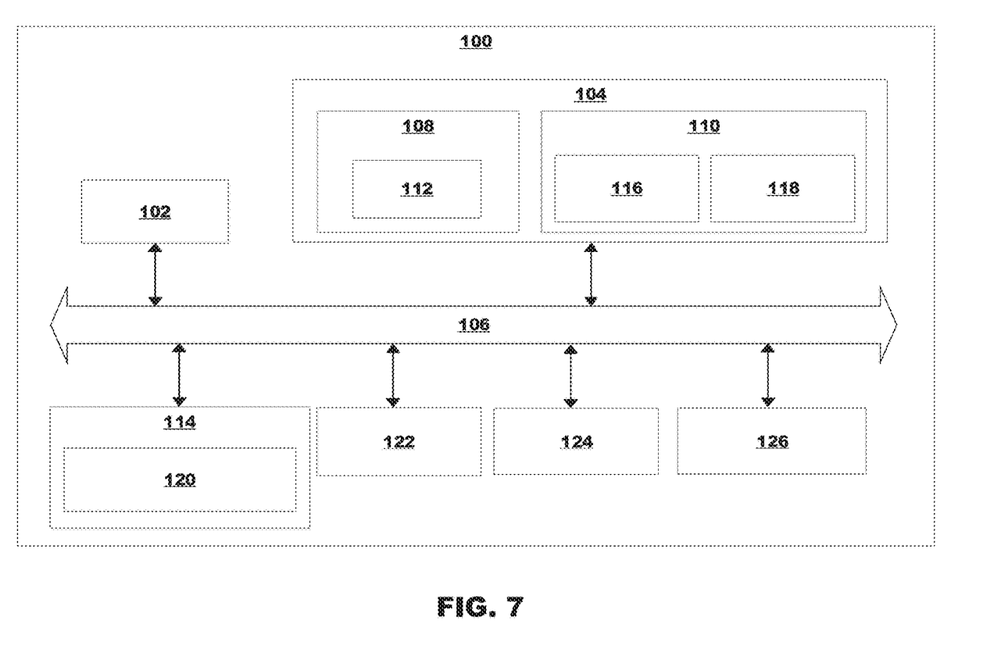
FIG. 7 is a schematic diagram of an exemplary computer system for implementing examples disclosed herein, according to an example.

FIG. 7 is a schematic diagram of a computer system 100 for implementing examples disclosed herein. The computer system 100 is adapted to execute instructions from a computer-readable medium to perform these and/or any of the functions or processing described herein. The computer system 100 may be connected (e.g., networked) to other machines in a LAN, an intranet, an extranet, or the Internet. While only a single device is illustrated, the computer system 100 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 100 may comprise at least one computing device or electronic device capable of including firmware, hardware, and/or executing software instructions to implement the functionality described herein. The computer system 100 may include processing circuitry 102 (e.g., processing circuitry including one or more processor devices or control units), a memory 104, and a system bus 106. The computer system 100 may include at least one computing device having the processing circuitry 102. The system bus 106 provides an interface for system components including, but not limited to, the memory 104 and the processing circuitry 102. The processing circuitry 102 may include any number of hardware components for conducting data or signal processing or for executing computer code stored in memory 104. The processing circuitry 102 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 102 may further include computer executable code that controls operation of the programmable device.

The system bus 106 may be any of several types of bus structures that may further interconnect to a memory bus (with or without a memory controller), a peripheral bus, and/or a local bus using any of a variety of bus architectures. The memory 104 may be one or more devices for storing data and/or computer code for completing or facilitating methods described herein. The memory 104 may include database components, object code components, script components, or other types of information structure for supporting the various activities herein. Any distributed or local memory device may be utilized with the systems and methods of this description. The memory 104 may be communicably connected to the processing circuitry 102 (e.g., via a circuit or any other wired, wireless, or network connection) and may include computer code for executing one or more processes described herein. The memory 104 may include non-volatile memory 108 (e.g., read-only memory (ROM), erasable programmable read-only memory (EPROM), electrically erasable programmable read-only memory (EEPROM), etc.), and volatile memory 110 (e.g., random-access memory (RAM)), or any other medium which can be used to carry or store desired program code in the form of machine-executable instructions or data structures and which can be accessed by a computer or other machine with processing circuitry 102. A basic input/output system (BIOS) 112 may be stored in the non-volatile memory 108 and can include the basic routines that help to transfer information between elements within the computer system 100.

The computer system 100 may further include or be coupled to a non-transitory computer-readable storage medium such as the storage device 114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 114 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 114 and/or in the volatile memory 110, which may include an operating system 116 and/or one or more program modules 118. All or a portion of the examples disclosed herein may be implemented as a computer program 120 stored on a transitory or non-transitory computer-usable or computer-readable storage medium (e.g., single medium or multiple media), such as the storage device 114, which includes complex programming instructions (e.g., complex computer-readable program code) to cause the processing circuitry 102 to carry out actions described herein. Thus, the computer-readable program code of the computer program 120 can comprise software instructions for implementing the functionality of the examples described herein when executed by the processing circuitry 102. In some examples, the storage device 114 may be a computer program product (e.g., readable storage medium) storing the computer program 120 thereon, where at least a portion of a computer program 120 may be loadable (e.g., into a processor) for implementing the functionality of the examples described herein when executed by the processing circuitry 102. The processing circuitry 102 may serve as a controller or control system for the computer system 100 that is to implement the functionality described herein.

The computer system 100 may include an input device interface 122 configured to receive input and selections to be communicated to the computer system 100 when executing instructions, such as from a keyboard, mouse, touch-sensitive surface, etc. Such input devices may be connected to the processing circuitry 102 through the input device interface 122 coupled to the system bus 106 but can be connected through other interfaces, such as a parallel port, an Institute of Electrical and Electronic Engineers (IEEE) 1394 serial port, a Universal Serial Bus (USB) port, an IR interface, and the like. The computer system 100 may include an output device interface 124 configured to forward output, such as to a display, a video display unit (e.g., a liquid crystal display (LCD) or a cathode ray tube (CRT)). The computer system 100 may include a communications interface 126 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: A computer system (100) comprising processing circuitry (102) configured to: determine that an auxiliary brake power (ABP) is insufficient to prevent a vehicle (1) running along a downhill road segment from exceeding a maximum engine speed (ES), determine a utilization rate (UR) of one or more service brakes (7) of the vehicle (1) to prevent the vehicle (1) from exceeding the maximum engine speed along the downhill road segment, determine that the utilization rate exceeds a predetermined threshold (TS), and based on the utilization rate exceeding the predetermined threshold (TS), control a downshift of the vehicle (1) to increase the auxiliary brake power.

Example 2: The computer system of Example 1, wherein the processing circuitry (102) is further configured to: activate said one or more service brakes (7) prior to control the downshift from a higher gear of a gearbox (5) of the vehicle (1) to a lower gear of the gearbox (5) of the vehicle (1).

Example 3: The computer system of any of Examples 1-2, wherein the processing circuitry (102) is further configured to: determine that the utilization rate does not exceed the predetermined threshold, and maintain a current gear of a gearbox (5) of the vehicle (1) based on the utilization rate not exceeding the predetermined threshold.

Example 4: The computer system of Example 3, wherein the processing circuitry (102) is further configured to: determine a utilization scheme for said one or more service brakes (7) to prevent the maximum engine speed to be exceeded along the downhill road segment, and activate said one or more service brakes (7) according to the utilization scheme.

Example 5: The computer system of any of Examples 1-4, wherein: the utilization rate is determined based on an idle time period (ID) until a required activation of the one or more service brakes (7), and wherein the predetermined threshold is a time value.

Example 6: The computer system of any of Examples 1-5, wherein: the utilization rate is determined based on a total activation time (AT) of the one or more service brakes (7), and wherein the predetermined threshold is a time value.

Example 7: The computer system of Example 6, wherein: the total activation time is a continuous activation time or a non-continuous activation time over a time period.

Example 8: The computer system of any of Examples 1-7, wherein: the utilization rate is determined based on activation duration (AD) and/or activation intensity (AI) of the one or more service brakes (7) of the vehicle (1).

Example 9: The computer system of any of Examples 1-8, wherein: the utilization rate is determined based on an estimated inclination (EI) of the downhill road segment.

Example 10: The computer system of any of Examples 1-8, wherein: the utilization rate is determined based on a measured or estimated rolling resistance (RR) and/or air drag (ADR) of the associated vehicle (1), and/or based on an estimated mass (EM) of the associated vehicle (1).

Example 11: The computer system of any of Examples 1-10, wherein: the utilization rate is determined based on the available amount of auxiliary brake power.

Example 12: The computer system of Example 1, wherein the processing circuitry (102) is further configured to: activate said one or more service brakes (7) prior to control the downshift from current higher gear of a gearbox (5) of the vehicle (1) to a lower gear of the gearbox (5) of the vehicle (1), maintain a current gear of the gearbox (5) of the vehicle (1) based on the utilization rate not exceeding the predetermined threshold, determine a utilization scheme for said one or more service brakes (7) to prevent the maximum engine speed to be exceeded along the downhill road segment, and activate said one or more service brakes (7) according to the utilization scheme, wherein the utilization rate is determined based on an idle time period until a required activation of the one or more service brakes (7), and/or based on a total activation time of the one or more service brakes (7), wherein the predetermined threshold is a time value and wherein the total activation time is a continuous activation time or a non-continuous activation time over a time period, and/or based on activation duration and/or activation intensity of the one or more service brakes (7) of the vehicle (1), wherein the utilization rate is determined based on an estimated inclination of the downhill road segment, and/or based on a measured or estimated rolling resistance and/or air drag of the associated vehicle (1), and/or based on an estimated mass of the associated vehicle (1), and/or based on the available amount of auxiliary brake power.

Example 13: A vehicle (1) comprising the computer system (100) of any of Examples 1-12.

Example 14: The vehicle of Example 13, further comprising: at least one gearbox (5), at least one service brake (7), and at least one auxiliary brake device (9), wherein the at least one auxiliary brake device (9) comprises a retarder.

Example 15: A computer-implemented method (50), comprising: determining (55), by processing circuitry (102) of a computer system (100), that an auxiliary brake power is insufficient to prevent a vehicle (1) running along a downhill road segment from exceeding a maximum engine speed, determining (56), by the processing circuitry (102), a utilization rate of one or more service brakes (7) of the vehicle (1) to prevent the vehicle (1) from exceeding the maximum engine speed along the downhill road segment, determining (57), by the processing circuitry (102), that the utilization rate exceeds a predetermined threshold, and based on the utilization rate exceeding the predetermined threshold controlling (59), by the processing circuitry (102), a downshift of the vehicle (1) to increase the auxiliary brake power.

Example 16: The computer-implemented method of Example 15, further comprising: activating said one or more service brakes prior to control the downshift from current higher gear of a gearbox of the vehicle to a lower gear of the gearbox of the vehicle.

Example 17: The computer-implemented method of any of Examples 15-16, further comprising: determining that the utilization rate does not exceed the predetermined threshold, and maintaining a current gear of a gearbox of the vehicle based on the utilization rate not exceeding the predetermined threshold.

Example 18: The computer-implemented method of Example 17, further comprising: determining a utilization scheme for said one or more service brakes to prevent the maximum engine speed to be exceeded along the downhill road segment, and activating said one or more service brakes according to the utilization scheme.

Example 19: A computer program product comprising program code for performing, when executed by the processing circuitry, the method of any of Examples 15-18.

Example 20: A non-transitory computer-readable storage medium comprising instructions, which when executed by the processing circuitry, cause the processing circuitry to perform the method of any of Examples 15-18.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. A computer system comprising processing circuitry configured to:
   determine that an auxiliary brake power is insufficient to prevent a vehicle running along a downhill road segment from exceeding a maximum engine speed;
   determine a utilization rate of one or more service brakes of the vehicle to prevent the vehicle from exceeding the maximum engine speed along the downhill road segment;
   determine that the utilization rate exceeds a predetermined threshold; and
   based on the utilization rate exceeding the predetermined threshold, control a downshift of the vehicle to increase the auxiliary brake power.

2. The computer system of claim 1, wherein the processing circuitry is further configured to:

activate the one or more service brakes prior to control the downshift from a higher gear of a gearbox of the vehicle to a lower gear of the gearbox of the vehicle.

3. The computer system of claim 1, wherein the processing circuitry is further configured to:
determine that the utilization rate does not exceed the predetermined threshold; and
maintain a current gear of a gearbox of the vehicle based on the utilization rate not exceeding the predetermined threshold.

4. The computer system of claim 3, wherein the processing circuitry is further configured to:
determine a utilization scheme for the one or more service brakes to prevent the maximum engine speed to be exceeded along the downhill road segment; and
activate the one or more service brakes according to the utilization scheme.

5. The computer system of claim 1, wherein:
the utilization rate is determined based on an idle time period until a required activation of the one or more service brakes, and wherein the predetermined threshold is a time value.

6. The computer system of claim 1, wherein:
the utilization rate is determined based on a total activation time of the one or more service brakes, and wherein the predetermined threshold is a time value.

7. The computer system of claim 6, wherein:
the total activation time is a continuous activation time or a non-continuous activation time over a time period.

8. The computer system of claim 1, wherein:
the utilization rate is determined based on activation duration and/or activation intensity of the one or more service brakes of the vehicle.

9. The computer system of claim 1, wherein:
the utilization rate is determined based on an estimated inclination of the downhill road segment.

10. The computer system of claim 1, wherein
the utilization rate is determined based on a measured or estimated rolling resistance and/or air drag of the associated vehicle, and/or based on an estimated mass of the associated vehicle.

11. The computer system of claim 1, wherein:
the utilization rate is determined based on the available amount of auxiliary brake power.

12. The computer system of claim 1, wherein the processing circuitry is further configured to:
activate the one or more service brakes prior to control the downshift from current higher gear of a gearbox of the vehicle to a lower gear of the gearbox of the vehicle;
maintain a current gear of the gearbox of the vehicle based on the utilization rate not exceeding the predetermined threshold;
determine a utilization scheme for the one or more service brakes to prevent the maximum engine speed to be exceeded along the downhill road segment; and
activate the one or more service brakes according to the utilization scheme;
wherein the utilization rate is determined based on an idle time period until a required activation of the one or more service brakes, and/or based on a total activation time of the one or more service brakes, wherein the predetermined threshold is a time value and wherein the total activation time is a continuous activation time or a non-continuous activation time over a time period, and/or based on activation duration and/or activation intensity of the one or more service brakes of the vehicle; and
wherein the utilization rate is determined based on an estimated inclination of the downhill road segment, and/or based on a measured or estimated rolling resistance and/or air drag of the associated vehicle, and/or based on an estimated mass of the associated vehicle, and/or based on the available amount of auxiliary brake power.

13. A vehicle comprising the computer system of claim 1.

14. The vehicle of claim 13, further comprising: at least one gearbox, at least one service brake, and at least one auxiliary brake device, wherein the at least one auxiliary brake device comprises a retarder.

15. A computer-implemented method, comprising:
determining, by processing circuitry of a computer system, that an auxiliary brake power is insufficient to prevent a vehicle running along a downhill road segment from exceeding a maximum engine speed;
determining, by the processing circuitry, a utilization rate of one or more service brakes of the vehicle to prevent the vehicle from exceeding the maximum engine speed along the downhill road segment;
determining, by the processing circuitry, that the utilization rate exceeds a predetermined threshold; and
based on the utilization rate exceeding the predetermined threshold, controlling, by the processing circuitry, a downshift of the vehicle to increase the auxiliary brake power.

16. The method of claim 15, further comprising:
activating the one or more service brakes prior to control the downshift from a current higher gear of a gearbox of the vehicle to a lower gear of the gearbox of the vehicle.

17. The method of claim 15, further comprising:
determining that the utilization rate does not exceed the predetermined threshold, and maintaining a current gear of a gearbox of the vehicle based on the utilization rate not exceeding the predetermined threshold.

18. The method of claim 15, further comprising:
determining a utilization scheme for the one or more service brakes to prevent the maximum engine speed to be exceeded along the downhill road segment, and activating the one or more service brakes according to the utilization scheme.

19. A computer program product comprising program code for performing, when executed by the processing circuitry, the method of claim 15.

20. A non-transitory computer-readable storage medium comprising instructions, which when executed by the processing circuitry, cause the processing circuitry to perform the method of claim 15.

* * * * *